Figure 1:
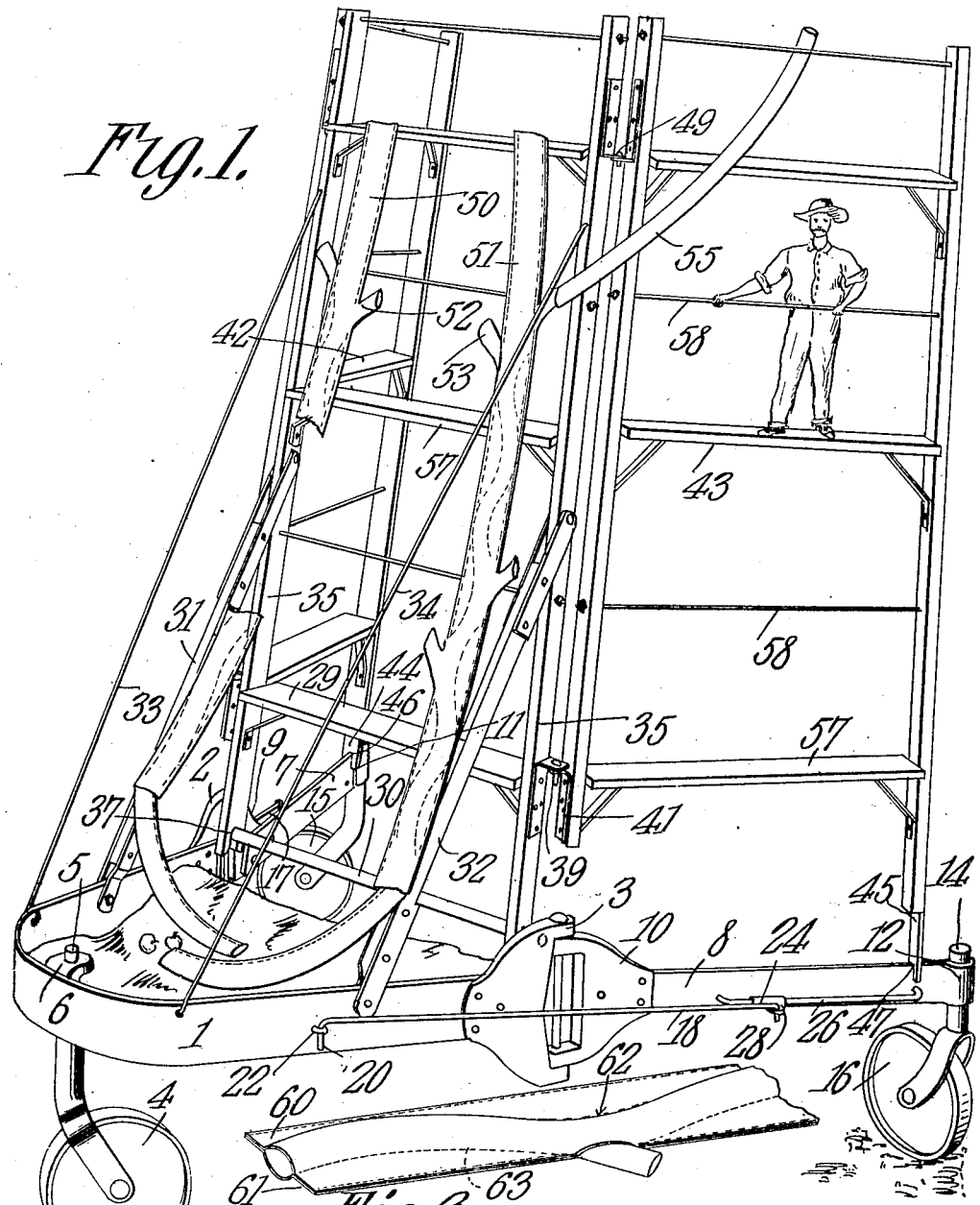

No. 882,161. PATENTED MAR. 17, 1908.
L. T. OLIVE.
PORTABLE LADDER LIKE SCAFFOLD.
APPLICATION FILED JULY 1, 1907.
2 SHEETS—SHEET 1.

Fig. 3. Leonidas T. Olive,
INVENTOR.
WITNESSES:
By C. A. Snow & Co.
ATTORNEYS

No. 882,161. PATENTED MAR. 17, 1908.
L. T. OLIVE.
PORTABLE LADDER LIKE SCAFFOLD.
APPLICATION FILED JULY 1, 1907.
2 SHEETS—SHEET 2.
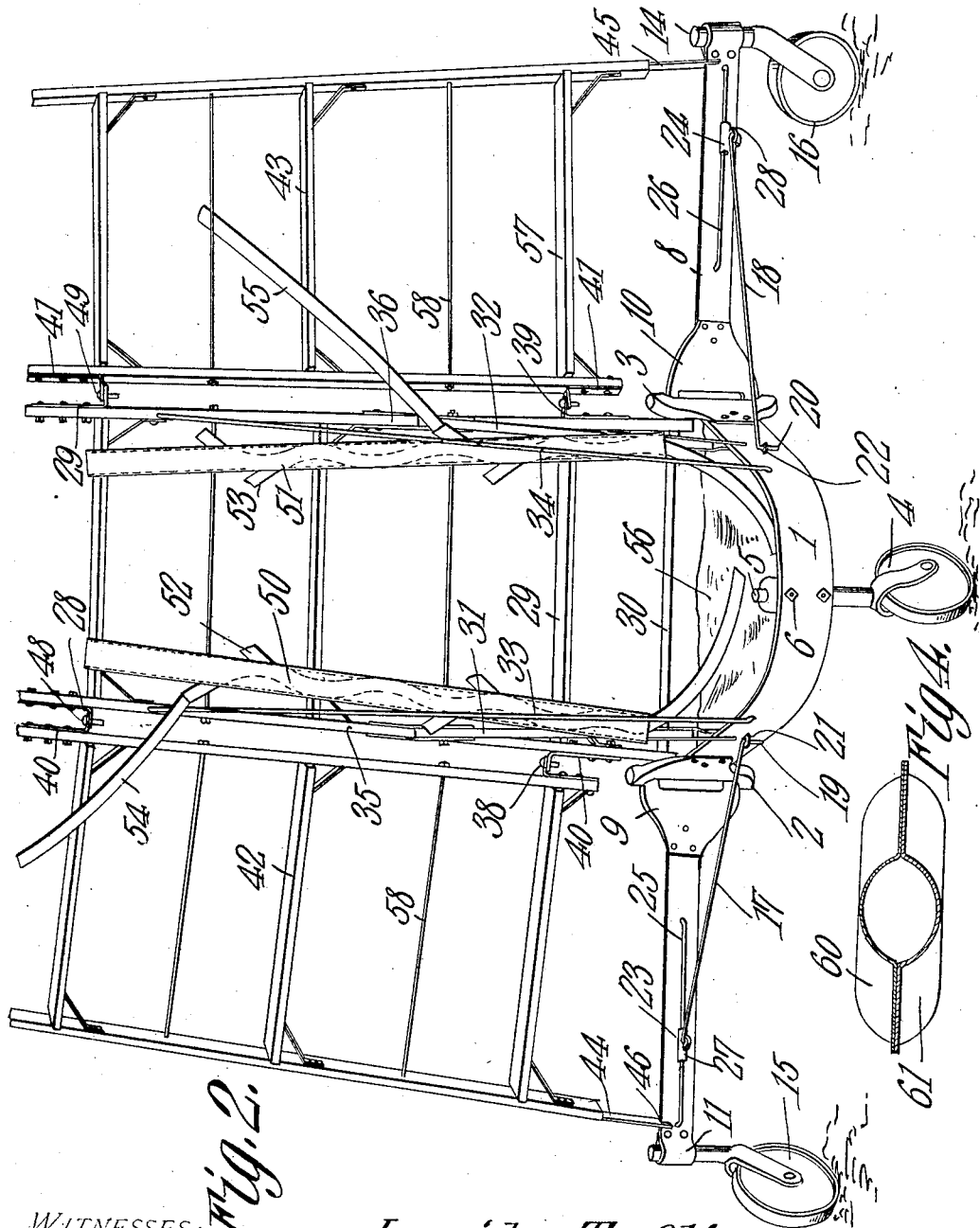
WITNESSES:
Leonidas T. Olive, INVENTOR.
By C. A. Snow & Co.
ATTORNEYS

UNITED STATES PATENT OFFICE.

LEONIDAS T. OLIVE, OF SARASOTA, FLORIDA.

PORTABLE LADDER-LIKE SCAFFOLD.

No. 882,161.  Specification of Letters Patent.  Patented March 17, 1908.

Application filed July 1, 1907. Serial No. 381,794.

*To all whom it may concern:*

Be it known that I, LEONIDAS T. OLIVE, a citizen of the United States, residing at Sarasota, in the county of Manatee and State of Florida, have invented a new and useful Portable Ladder-Like Scaffold, of which the following is a specification.

The present invention relates to improvements in portable structures of the character employed in gathering fruit from trees, painting, and for other purposes where it is necessary to reach altitudes that are inaccessible without the aid of a ladder, and it has for its object to provide an improved device of this character that is capable of being manipulated easily for placing it in position, such as adjacent to a tree or house, and it is constructed in sections that are adjustable angularly relatively to one another in order that they may be arranged according to the object adjacent to which the ladder is to be placed, the sections being capable of arrangement at several sides of a tree so that the picking of the fruit may proceed simultaneously.

To these and other ends, the invention comprises the various novel features of construction and combination and arrangement of parts, which will be hereinafter more fully described and pointed out particularly in the appended claims.

In the accompanying drawing:—Figure 1 is a perspective view of a portable ladder-like structure made in accordance with the present invention, the ladder-like sections being shown in such relation that they are capable of partially surrounding a tree. Fig. 2 is a similar view showing the ladder-like sections arranged in alinement, adapting the device for the purposes of a scaffold for painting or similar structure. Figs. 3 and 4 are detail views of the main conductor through which fruit may descend to a suitable receptacle.

Corresponding parts in the several figures are indicated throughout by similar characters of reference.

The structure shown in the present embodiment of the invention comprises generally a frame composed, in the present instance, of an intermediate yoke-shaped section 1 having a pair of hinge knuckles 2 and 3 arranged on the ends thereof, the axes of the knuckles being arranged vertically, and the central portion of the yoke is supported in the present instance by means of a caster 4 adapted to rest upon the ground to support a portion of the ladder and having a vertical journal portion 5 coöperating with a bearing bracket 6 bolted or otherwise secured to the yoke. A pair of horizontally adjustable arms 7 and 8 also form a part of the frame, these arms being provided with hinge members or knuckles 9 and 10 to coöperate with the knuckles 2 and 3 of the intermediate section of the frame, and the outer ends of the arms are provided with bearings 11 and 12 to receive the vertical journal portions 13 and 14 of a pair of casters 15 and 16, the several casters supporting the frame being capable of rotation on a vertical axis in order that the frame may be easily moved in any direction without the necessity of lifting it.

In practice, it is preferable to limit the range of movement of the adjustable arms in order that the supporting casters may be sufficiently separated at all times to insure the requisite stability for the structure, the limiting devices or stops shown in the present instance comprising a pair of rods 17, 18 having hooks 19 and 20 thereon to detachably engage a pair of eyes 21 and 22 arranged at the opposite sides of the yoke, the opposite ends of the rods being pivotally attached to a pair of slides 23 and 24 which operate longitudinally on guides 25 and 26 secured to the arms 7 and 8, respectively, set screws 27 and 28 serving to lock the slides in fixed relation on the respective guides and thereby retain the arms in any desired angular relation, so that the arms cannot turn accidentally. The superstructure is composed, in the present instance, of a set of ladder-like sections, the center or intermediate section 29 having its lower end supported on a cross piece 30 which connects the free ends of the yoke arms and it is rigidly supported in upright position by means of a pair of diagonal braces 31 and 32 which extend from the yoke arm to the said ladder-like section, and forward tilting of the intermediate section is prevented by the stay wires or rods 33 and 34 which are attached at their lower ends to the yoke shaped portion of the frame and are connected at their upper ends to the upper portion of the ladder-like section.

In order to facilitate shipment or storage of the device, it is preferable to detachably mount the ladder-like sections on the supporting frame, and to this end the lower ends of the rails 35 and 36 of the central section are slotted, as at 37, so as to detachably engage the cross piece 30, and the braces and stays are preferably provided with bolts and hooks, respectively, as shown, whereby they may be detachably secured in position, the sections being capable of removal and are adapted to fold together in a compact space.

The outer sides of the central section are provided with hinge members 38 and 39 to coöperate with the hinge members 40 and 41, respectively, of the relatively adjustable sections 32 and 33, the axes of the hinges connecting the ladder-like sections being arranged substantially in alinement with those connecting the frame sections, in order that the relatively adjustable sections may turn with the adjustable arm of the supporting frame, the outer ends of the relatively adjustable sections being operatively connected to and supported upon the adjustable frame arms by means of the legs 44 and 45, the latter being preferably slotted, as shown at 46 and 47, to detachably fit over the upper edges of the respective arms and frame, and the hinge members of the sections are preferably connected by detachable or removable pins or pintles 48 and 49 whereby the adjustable sections may be lifted to disengage the slotted ends of the supporting legs thereon from the arms of the supporting frame, and the lifting movement will serve to disengage the hinge members connecting the sections.

When the apparatus is employed in gathering fruit, it is preferable to provide means for conducting the fruit to a suitable receptacle on the ground in a manner that will insure the fruit from injury or bruising, and in the present instance a pair of conductors 50 and 51 are provided which are secured preferably to the central or relatively stationary section and provided with branches 52 and 53 arranged at different elevations and adapted to receive interchangeably the branch tubes 54 and 55, the latter being attached to the conductors at different elevations according to the point where the operator is working, the lower ends of the conductors being suitably arranged to discharge into a receptacle. The receptacle employed in the present instance is composed of a diaphragm of flexible material, such as burlap, or the like, it being stretched across the bottom of the yoke-shaped section of the frame to form a soft bottom 56 on which the fruit is discharged by the conductors. The ladder-like sections are provided with steps or platforms 57 of a suitable width to enable the operator to stand thereon, and at intervals between the platforms are provided guards which are arranged to engage the body of the operator preferably at about the waist line to prevent falling, the guard shown in the present instance being composed of rods or pieces of relatively heavy wire 58 stretched between the upright rails of the ladder-like sections and approximately midway between two adjacent platforms, the latter being spaced ordinarily about seven feet apart.

In practice, the structure is transported from one place to another on casters and, when it is desirable to place the structure in position for gathering fruit from a tree, the central section of the scaffold is moved into position at one side of the tree and, by loosening the set screws 27 and 28, the adjustable arms of the supporting frame may be turned until the adjustable sections are brought into engagement with the sides of the tree, the parts being locked in such relation by tightening the set screws. The branch tubes are attached to the conductors according to the elevation at which the operator is working, the fruit picked being deposited into the branch tubes and from the latter it enters the vertical conductor, discharging from the lower end thereof into the receptacle formed in the bottom of the frame.

Any suitable form of conductor may be employed, although it is generally preferable to employ one such as that shown in Figs. 3 and 4, which is composed of a pair of strips of canvas or other flexible material 60 and 61 sewed together by a pair of zig-zag seams or rows of stitching 62 and 63 forming a tortuous passage for retarding the fruit in descending the conductor, so that liability of bruising is avoided.

In using the structure as a scaffold for painting or like operations, the conductors and coöperating parts, of course, may be omitted, and the ladder-like sections may be adjusted either in alinement or in any other desired relation by suitably turning the arms of the supporting frame, the stops coöperating to prevent accidental shifting of the ladder-like sections.

The present invention provides a structure composed of a plurality of ladder-like sections that may be readily moved from place to place and arranged in any desired relation to an object, the adjustable feature of the sections enabling the structure to be placed in close relation with a considerable portion of the object so that frequent shifting of the structure is avoided.

What is claimed is:—

1. In a structure of the character described, the combination with a supporting frame, of a set of ladder-like sections mounted thereon and adjustable angularly relatively to one another so as to lie in different vertical planes.

2. In a structure of the character described, the combination with a supporting frame, of a set of ladder-like sections pivotally connected to turn on vertical axes.

3. In a structure of the character described, the combination with a supporting frame embodying an intermediate section, and relatively adjustable sections pivotally connected thereto, of an intermediate ladder-like section rigidly mounted on the intermediate section of the frame, and adjustable ladder-like sections pivotally connected to the intermediate section and operatively connected to the adjustable frame sections.

4. In a structure of the character described, the combination with a supporting frame embodying an intermediate section, and a pair of arms pivotally attached thereto, of a central ladder-like section rigidly mounted on the intermediate section of the supporting frame, and a pair of adjustable ladder-like sections pivotally attached to the central ladder-like section on axes substantially in alinement with the axes of adjustment of the frame arms and operatively connected to the latter.

5. In a structure of the character described, the combination with a supporting frame embodying an intermediate portion and a pair of arms pivotally connected thereto, of a central ladder-like section detachably mounted on the intermediate frame section, a pair of adjustable ladder-like sections foldable relatively to the central ladder-like section and detachably connected to the said arms of the frame.

6. In a structure of the character described, the combination with a supporting frame embodying an intermediate section and arms pivotally attached thereof, of ladder-like sections mounted on the said section and arms of the frame, and means for limiting the relative movement of the arms.

7. In a structure of the character described, the combination with a supporting frame embodying an intermediate section and arms pivotally attached thereto, of ladder-like sections mounted on the said section and arms of the frame, and devices for securing the frame arms in different adjusted positions relatively to the intermediate section.

8. In a structure of the character described, the combination with a supporting frame embodying an intermediate section and arms pivotally attached thereto, of ladder-like sections mounted on the said section and arms of the frame, a guide extending longitudinally of each arm, a slide mounted to operate therein, a rod attached to the intermediate section of the frame and its respective slide, and a device carried by the slide for locking the latter in different positions of adjustment longitudinally of its respective guide.

9. In a structure of the character described, the combination with a supporting frame embodying an intermediate section, and a pair of arms pivotally connected thereto, of a set of ladder-like sections mounted on the arms and intermediate section of the frame, and casters on the intermediate section and the arms of the frame.

10. In a structure of the character described, the combination with a supporting frame embodying an intermediate yoke-shaped section having hinge knuckles on its ends, and a pair of arms having knuckles coöperating with those of the intermediate section, and a cross bar connecting the ends of the yoke-shaped section, of ladder-like sections mounted on the cross bar of the intermediate section and on the adjustable arms.

In testimony that I claim the foregoing as my own, I have hereto affixed my signature in the presence of two witnesses.

LEONIDAS T. OLIVE.

Witnesses:
ERNEST J. BRIGAT,
C. V. S. WILSON.